United States Patent
Lee et al.

(10) Patent No.: US 9,749,817 B2
(45) Date of Patent: *Aug. 29, 2017

(54) METHOD OF PROVIDING SERVICE TO USER EQUIPMENT IN WIRELESS COMMUNICATION SYSTEM AND APPARATUS THEREOF

(71) Applicant: LG ELECTRONICS INC., Seoul (KR)

(72) Inventors: Youngdae Lee, Anyang-si (KR);
Seungjune Yi, Anyang-si (KR);
Sungduck Chun, Anyang-si (KR);
Sungjun Park, Anyang-si (KR);
Sunghoon Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 13 days.

This patent is subject to a terminal disclaimer.

(21) Appl. No.: 15/163,408

(22) Filed: May 24, 2016

(65) Prior Publication Data
US 2016/0269875 A1    Sep. 15, 2016

Related U.S. Application Data

(63) Continuation of application No. 13/704,180, filed as application No. PCT/KR2012/002099 on Mar. 23, 2012, now Pat. No. 9,369,993.

(Continued)

(51) Int. Cl.
*H04W 4/06* (2009.01)
*H04W 36/00* (2009.01)
(Continued)

(52) U.S. Cl.
CPC ........... *H04W 4/06* (2013.01); *H04L 65/4076* (2013.01); *H04W 36/0072* (2013.01);
(Continued)

(58) Field of Classification Search
None
See application file for complete search history.

(56) References Cited

U.S. PATENT DOCUMENTS 7,821,979 B2   10/2010   Lee et al.
8,503,401 B2    8/2013   Wang
(Continued)

FOREIGN PATENT DOCUMENTS

EP    1643787 A2    4/2006
EP    1924103 A2    5/2008
(Continued)

OTHER PUBLICATIONS

Huawei, "WID: Service Continuity and Location Information for MBMS for LTE," TSG-RAN Meeting 51, RP-110452, Mar. 2011, pp. 1-6.*

(Continued)

*Primary Examiner* — Donald Mills
(74) *Attorney, Agent, or Firm* — Birch, Stewart, Kolasch & Birch, LLP

(57) ABSTRACT

A communication method performed by a user equipment (UE). The UE receives, from a network, system information including one or more frequencies for a multimedia broadcast multicast service (MBMS) service and information of a mapping relationship between one or more frequencies and a plurality of MBMS services. The UE identifies, using the received system information, a specific frequency among the one or more frequencies for the MBMS service, and transmits, to the network, a radio resource control (RRC) message including the identified frequency for the MBMS service.

16 Claims, 12 Drawing Sheets

Related U.S. Application Data

(60) Provisional application No. 61/473,157, filed on Apr. 8, 2011, provisional application No. 61/471,667, filed on Apr. 4, 2011, provisional application No. 61/471,179, filed on Apr. 3, 2011.

(51) Int. Cl.
  *H04W 72/04*    (2009.01)
  *H04L 29/06*    (2006.01)

(52) U.S. Cl.
  CPC ....... *H04W 72/04* (2013.01); *H04W 72/0406* (2013.01); *H04W 72/0453* (2013.01)

(56) References Cited

U.S. PATENT DOCUMENTS

| | | | |
|---|---|---|---|
| 8,712,414 | B2 | 4/2014 | Somasundaram et al. |
| 2003/0231612 | A1* | 12/2003 | Kim ................ H04W 36/12 370/342 |
| 2004/0103435 | A1* | 5/2004 | Yi ................ H04W 72/005 725/81 |
| 2006/0023664 | A1 | 2/2006 | Jeong et al. |
| 2007/0218929 | A1* | 9/2007 | Kuo ................ H04W 4/06 455/466 |
| 2008/0049682 | A1 | 2/2008 | Ding et al. |
| 2008/0113662 | A1 | 5/2008 | Kuo |
| 2008/0207211 | A1 | 8/2008 | Kwak et al. |
| 2009/0116417 | A1 | 5/2009 | Hu |
| 2010/0113030 | A1 | 5/2010 | Kanazawa et al. |
| 2010/0189027 | A1 | 7/2010 | Ishida et al. |
| 2010/0272004 | A1 | 10/2010 | Maeda et al. |
| 2011/0305183 | A1* | 12/2011 | Hsu ................ H04W 72/005 370/312 |
| 2011/0305184 | A1 | 12/2011 | Hsu |
| 2013/0044668 | A1* | 2/2013 | Purnadi ............. H04W 36/0055 370/312 |

FOREIGN PATENT DOCUMENTS

| | | |
|---|---|---|
| EP | 1638359 B1 | 12/2009 |
| KR | 10-2006-0014910 A | 2/2006 |
| WO | WO 2006/014092 A1 | 2/2006 |

OTHER PUBLICATIONS

3GPP TS 25.331 V6.25.0, Radio Resource Control (RRC) Specification, Release 6, Mar. 25, 2010, pp. 369-387.
3GPP TSG 25.331, V6.11.0 (Sep. 2006), Release 637T, 1248 pages.
LG Electronics Inc. et al., "MBMS PI Service Restriction Information and Preferred Frequency Layer," 3GPP TSG-RAN WG3 Meeting #56, R2-063613, Nov. 6-10, 2006, Riga, Latvia, 8 pages.

\* cited by examiner (a) Control-plane protocol stack (b) User-plane protocol stack

METHOD OF PROVIDING SERVICE TO USER EQUIPMENT IN WIRELESS COMMUNICATION SYSTEM AND APPARATUS THEREOF

CROSS-REFERENCE TO RELATED APPLICATIONS

This Application is a Continuation of U.S. patent application Ser. No. 13/704,180 filed on Dec. 13, 2012 (now U.S. Pat. No. 9,369,993 issued on Jun. 14, 2016), which is filed as the National Phase of PCT/KR2012/002099 filed on Mar. 23, 2012, which claims the benefit under 35 U.S.C. §119(e) to U.S. Provisional Application Nos. 61/473,157 filed on Apr. 8, 2011, 61/471,667 filed on Apr. 4, 2011, and 61/471,179 filed on Apr. 3, 2011, all of which are hereby expressly incorporated by reference into the present application.

BACKGROUND OF THE INVENTION

The present invention relates to a wireless communication system, and more particularly, to a method of providing service to a user equipment in a wireless communication system and apparatus therefor.

First of all, in the following description, 3GPP LTE (3rd generation partnership projecting long term evolution) communication system is schematically explained as an example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to. Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information, and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

SUMMARY OF THE INVENTION

Based on the above-mentioned discussion, a method of providing service to a user equipment in a wireless communication system and apparatus therefore shall be proposed in the following description.

To achieve these and other advantages and in accordance with the purpose of the present invention, as embodied and broadly described, a method for processing a signal by a user equipment (UE) in a wireless communication system comprises receiving information on at least one frequency from a network; selecting a frequency from the at least one frequency corresponding to a specific service; and transmitting, to the network, a message indicating the selected frequency.

Preferably, the method comprises receiving information on a relation between the at least one frequency and at least one service.

Further, the method can comprise receiving a command for performing a handover from a serving cell to a target cell providing the specific service through the selected frequency. Here, the serving cell selects the target cell from at least one neighbor cell providing the specific service through the selected frequency.

In another aspect of the present invention, a user equipment in a wireless communication system comprises a receiving module configured to receives information on at least one frequency from a network; a processor configured to select a frequency from the at least one frequency corresponding to a specific service; and a transmitting module configured to transmit a message indicating the selected frequency to the network.

Preferably, the receiving module is further configured to receive information on a relation between the at least one frequency and at least one service.

Further, the receiving module is further configured to receive a command for performing a handover from a serving cell to a target cell providing the specific service through the selected frequency. Here, the serving cell selects the target cell from at least one neighbor cell providing the specific service through the selected frequency.

Further, the message includes at least one of information on the specific service and information on an area corresponding to the specific service.

Further, the information on the at least one frequency is included in a system information broadcasted by the network.

Preferably, the user equipment is in an RRC (radio resource control) connected state (RRC_CONNECTED) with the network.

According to an embodiment of the present invention, a base station is able to provide an effective MBMS to a user equipment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

DETAILED DESCRIPTION OF THE EMBODIMENTS

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 1:
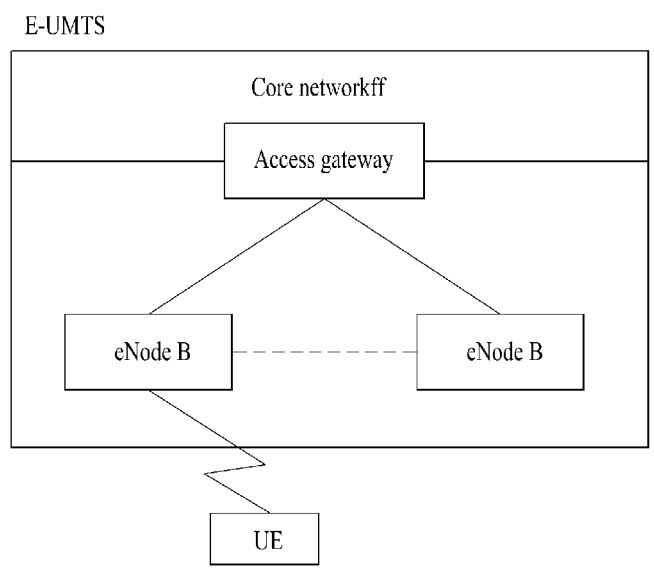
FIG. 1 is a schematic diagram of E-UMTS network structure as an example of a mobile communication system.
Figure 2:
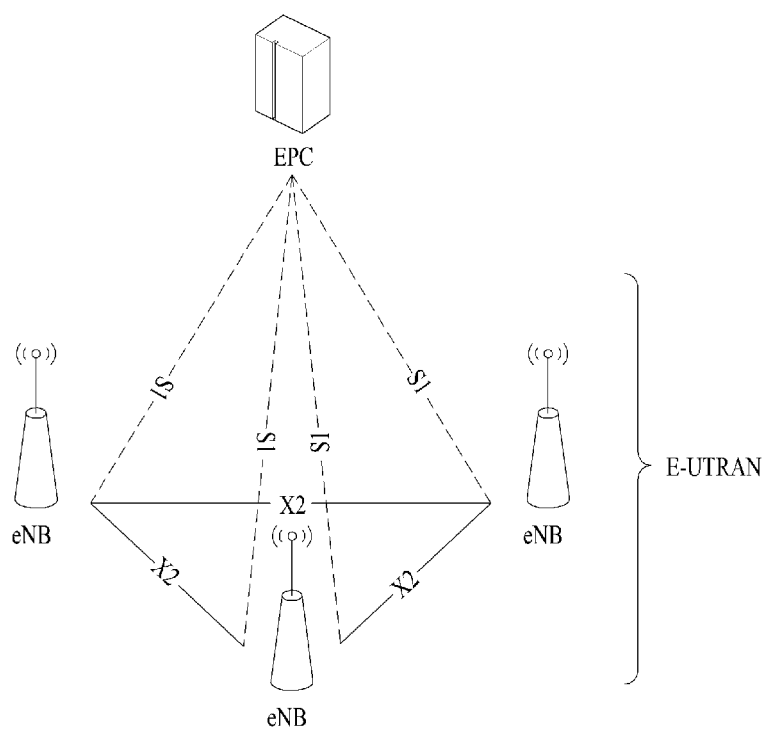
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
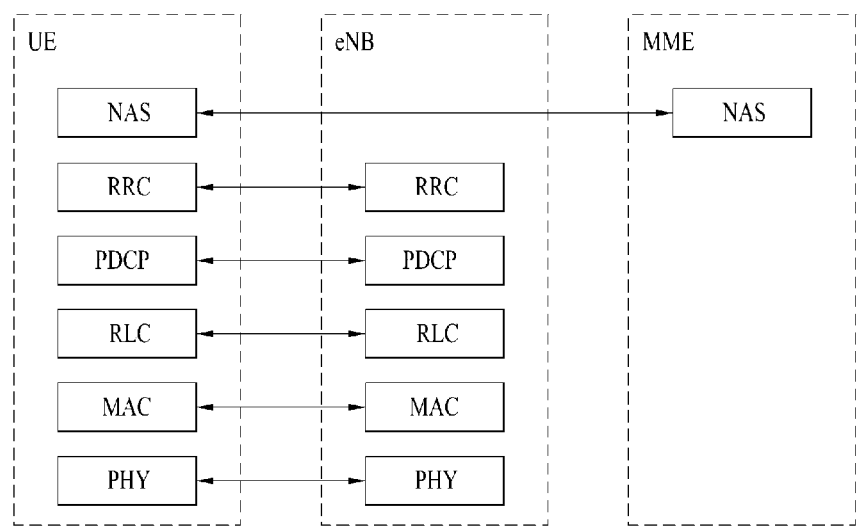
FIG. 3 shows in (a) a diagram of structure of a control plane and in (b) a structure of a user plane of a radio interface protocol between a user equipment and E-UTRAN based on 3GPP radio access network specification.
Figure 3:
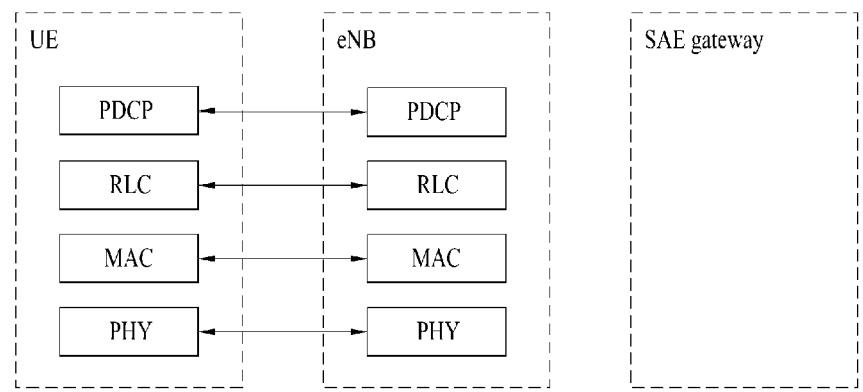

FIG. 3($a$) is a diagram of a structure of a control plane and FIG. 3($b$) is a diagram of a structure of a user plane of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
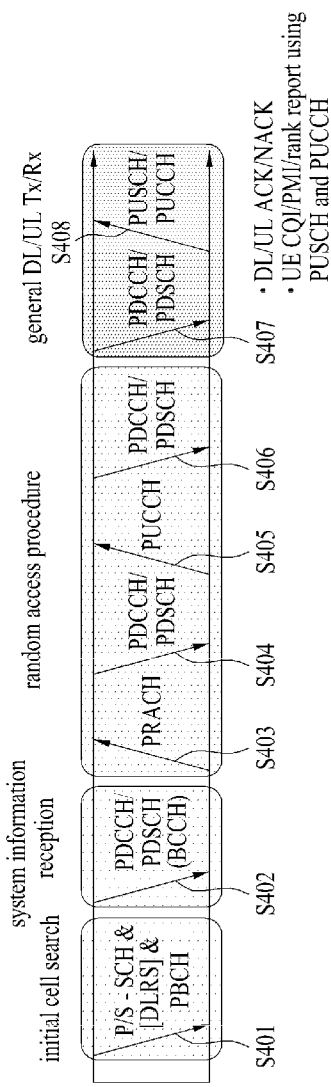
FIG. 4 is a diagram for explaining physical channels used for 3GPP system and a general method of transmitting a signal using the same.

FIG. 4 is a diagram for explaining physical channels used for 3GPP system and a general method of transmitting a signal using the same.

If a power of a user equipment is turned on or the user equipment enters a new cell, the user equipment performs an initial cell search for matching synchronization with a base station and the like [S401]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
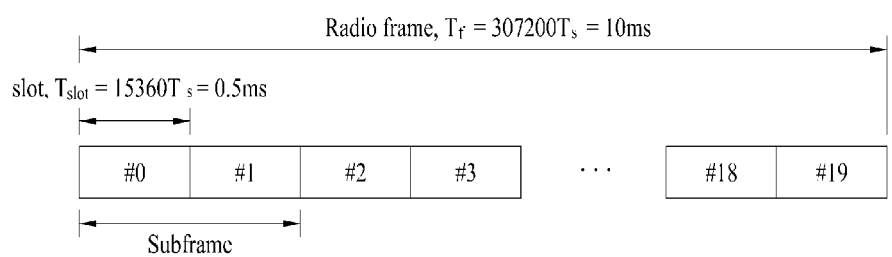
FIG. 5 is a diagram for an example of a structure of a radio frame used for LTE system.

FIG. 5 is a diagram for an example of a structure of a radio frame used for LTE system.

Referring to FIG. 5, a radio frame has a length of 10 ms (327200·Ts) and is constructed with 10 subframes in equal size. Each of the subframes has a length of 1 ms and is constructed with two slots. Each of the slots has a length of 0.5 ms (15360·Ts). In this case, Ts indicates a sampling time and is expressed as Ts=1/(15 kHz×2048)=3.2552×10-8 (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

In the following description, an RRC state of a user equipment and a corresponding RRC connecting method are explained. In this case, the RRC state means whether an RRC of a user equipment is logically connected to an RRC of E-UTRAN (i.e., logical connection). If the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is managed by a CN by a TA unit that is an area unit greater than a cell. In particular, in order to receive such a service as voice and data from a cell, a user equipment in an RRC idle state should make a transition to an RRC connected state.

Specifically, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it means the case that an uplink data transmission is necessary due to user's call attempt or the like or the case that a response message needs to be sent in case of receiving a paging message from the E-UTRAN.

Figure 6:
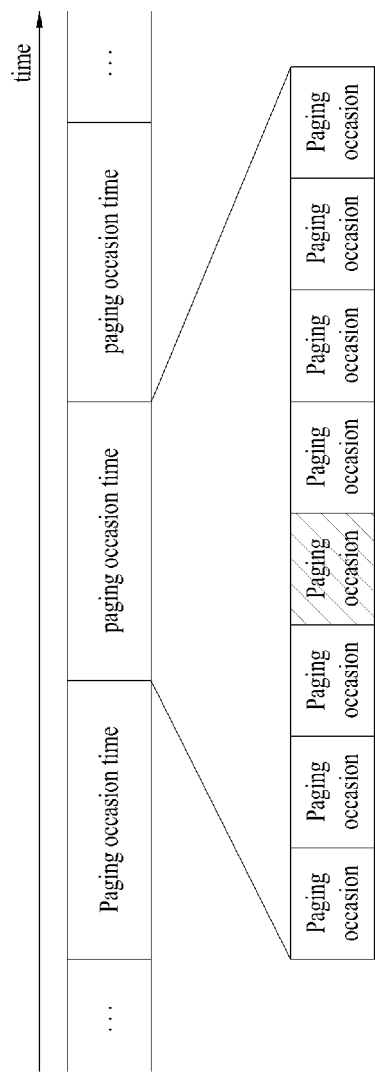
FIG. 6 is a diagram for explaining a general transceiving method using a paging message.

FIG. 6 is a diagram for explaining a general transceiving method using a paging message.

Referring to FIG. 6, a paging message contains a paging cause and a paging record including a UE identity and the like. When the paging message is received, a user equipment is able to perform a discontinuous reception (DRX) for the purpose of power consumption reduction.

In particular, a network configures several paging occasions (POs) for each time cycle called a paging DRX cycle to enable a specific user equipment to obtain a paging message by receiving a specific paging occasion only. The user equipment does not receive a paging channel in a time except the specific paging occasion and is able to stay in a sleep mode to reduce power consumption. And, one paging occasion corresponds to one TTI.

A base station and a user equipment use a paging indicator (PI) as a specific value indicating a transmission of a paging message. The base station defines a specific identity (e.g., paging-radio network temporary identity: P-RNTI) for a usage of the PI and is then able to inform the user equipment of the paging information transmission. For instance, a user equipment wakes up each DRX cycle and then receives one subframe to recognize a presence or non-presence of a paging message. If P-RNTI is contained in L1/L2 control channel (PDCCH) of the received subframe, the user equipment is able to recognize that the paging message exists in PDSCH of the corresponding subframe. If a UE identity (e.g., IMSI) of the user equipment is contained in the paging message, the user equipment makes a response (e.g., RRC connection, system information reception, etc.) to the base station and is then able to receive a service.

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system information related to each other. For instance, a specific SIB contains information of a neighbor cell only and another SIB just contains information of a UL radio channel used by a user equipment.

Now, cell selection and cell reselection will be described below.

When a UE is powered on, the UE should prepare for receiving a service by selecting a cell having an appropriate quality. In RRC idle state, the UE should select a cell having an appropriate quality and prepare for receiving a service from the cell. For example, shortly after being powered on, the UE should select a cell having an appropriate quality to register to the network. If the UE transitions from RRC connected state to the RRC idle state, the UE should select a cell in which it will stay in the RRC idle state. In this manner, the process in which a UE selects a cell satisfying a specific condition to stay in a service idle state such as the RRC idle state is called cell selection. Because cell selection is performed when a UE has not decided yet on a cell in which it will stay in the RRC idle state, it is very important to select a cell as quickly as possible. Therefore, as far as a cell offers a radio signal quality at a specific level or higher, the UE may select the cell even though the cell is not the best cell.

Once the UE selects a cell satisfying a cell selection criterion, the UE acquires information needed for operating in the RRC idle state in the cell from system information of the cell. After receiving all information required to operate in the RRC idle state, the UE requests a service to the network or waits in the RRC idle state to receive a service from the network.

After the UE selects a cell during the cell selection procedure, the strength or quality of a cell may change between the UE and an eNB due to a change in the mobility of the UE or a radio environment. If the quality of the selected cell is degraded, the UE may select another cell offering a better quality. In this case, the UE typically selects a cell that provides a better signal quality than the current cell. This process is called cell reselection. The basic purpose of cell reselection is to select a cell offering the best quality to a UE. Aside from the aspect of radio signal quality, the network may prioritize frequencies and notify the UE of the priority levels of the frequencies. Then the UE puts the priority levels of the frequencies before radio signal qualities during cell reselection.

In the following description, MBMS (multimedia broadcast multicast service) is explained. First of all, MBMS (multimedia broadcast multicast service) is a kind of a broadcast/multicast service and is the service for transmitting multimedia data packets to a plurality of user equipments simultaneously. 'Broadcast/multicast service' or '/MBMS' used in the present disclosure can be substituted with such a terminology as 'point-to-multipoint service', 'MBS (multicast and broadcast service)' and the like. In the MBMS based on IP multicast, user equipments share a resource required for data packet transmission with each other and then receive the same multimedia data. Hence, in case that user equipments on a predetermined level using MBMS exist in the same cell, it is able to raise resource efficiency. Since the MBMS has no relation with an RRC connected state, a user equipment in an idle state is able to receive the corresponding service.

A logical channel MCCH (MBMS control channel) or MTCH (MBMS traffic channel) for MBMS can be mapped to a transport channel MCH (MBMS channel). The MCCH carries an RRC message containing MBMS related common control information, while the MTCH carries a traffic of a specific MBMS service. A single MCCH exists in a single MBSFN (MBMS single frequency network) area to carry the same MBMS information or traffic. In case that a plurality of MBSFN areas are provided by a single cell, a user equipment may be able to receive a plurality of MCCHs.

Figure 7:
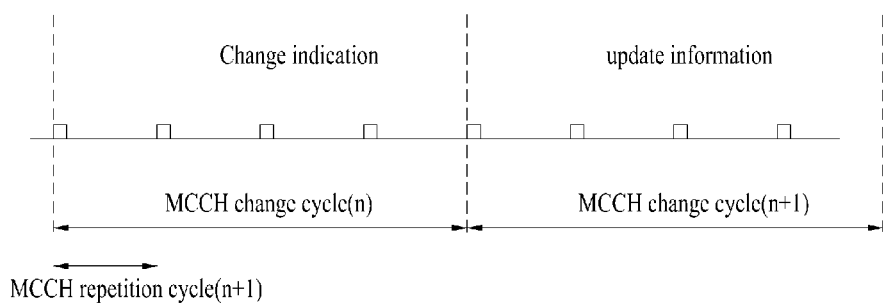
FIG. 7 is a diagram for a transmission scheme of MCCH (MEMS control channel).

FIG. 7 shows a transmission scheme of MCCH information.

Referring to FIG. 7, if an MBMS related RRC message is changed in a specific MCCH, PDCCH transmits M-RNTI (MBMS-radio network temporary identity) and an MCCH indicator indicating a specific MCCH. A user equipment, which supports MBMS, receives the M-RNTI and the MCCH indicator via the PDCCH, recognizes that the MBMS related RRC message has been changed, and is then able to receive the specific MCCH. The RRC message of the MCCH can be changed each change cycle and is repeatedly broadcasted each repetitive cycle.

Meanwhile, the MCCH transmits MBSFNAreaConfiguration message that indicates a ongoing MBMS session and a corresponding RB setting. And, the MCCH is able to transmit an MBMS counting request (MBMSCountingRequest) message for counting the number of user equipments in an RRC connected state, each of which receives or intends to receive at least one MBMS service.

A specific MBMS control information can be provided via BCCH. In particular, the specific MBMS control information can be contained in SystemInformationBlockType13 broadcasted via the BCCH.

As described above, the network can count the number of user equipments, each of which receive or intends to receive a specific service, i.e. a specific MBMS, through an MBMS counting procedure. In a conventional MBMS counting procedure, if the network transmits an MBMS counting request message, the user equipment transmits an MBMS counting response message through a DCCH (dedicated control channel).

Figure 8:
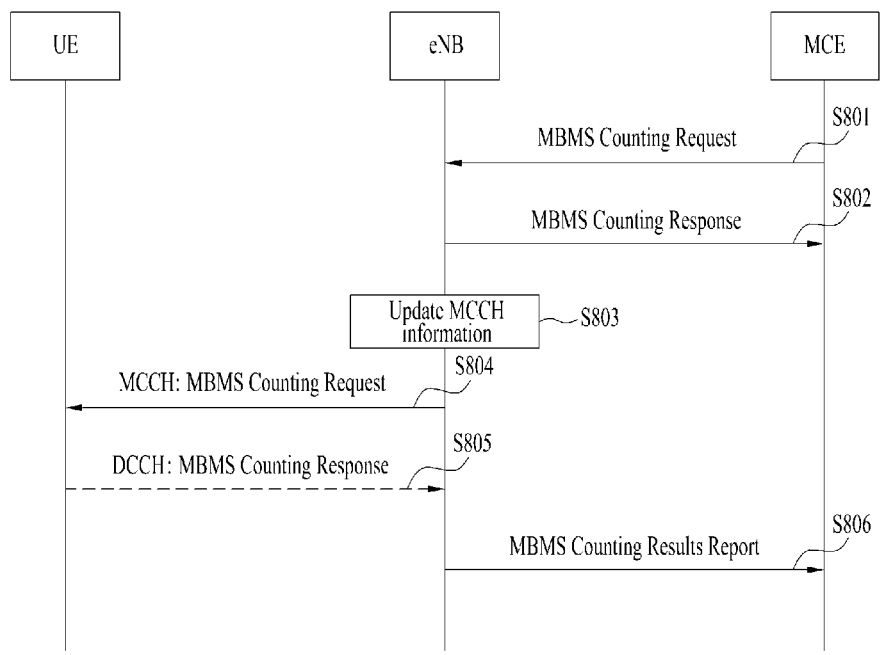
FIG. 8 is a flowchart showing a conventional MBMS counting procedure.

FIG. 8 is a flowchart showing a conventional MBMS counting procedure.

Referring to FIG. 8, a base station (eNB) starts a counting procedure according to an MBMS counting request from an MCE (MBMS Coordinating Entity) and an MBMS counting response corresponding thereto in steps S801 and S802. The MCE refers to a network entity performing admission control, radio resource allocation, session control signaling etc. Next, the eNB updates MCCH information according to information included in the MBMS counting request in step S803.

The eNB broadcasts an MBMS counting request message through an MCCH in step S804. The MBMS counting request message includes an MBMS ID list. A user equipment which monitors the MCCH in an MBSFN area may receive the counting request message through the MCCH. If an ID of a service that the user equipment intends to receive is included in the counting request message, the user equipment transmits an MBMS counting response message to the eNB through a DCCH in step S805.

Finally, the eNB may receive counting response messages for a corresponding service from a plurality of user equipments, counts the number of user equipments transmitting the response message and informs the MCE of an MBMS counting result in step S806.

Figure 9:
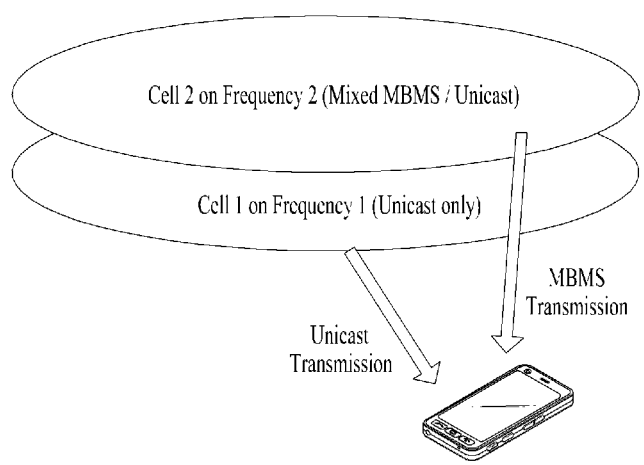
FIG. 9 is diagram for explaining problems which may be generated in a conventional MBMS receiving procedure.

FIG. 9 is diagram for explaining problems which may be generated in a conventional MBMS receiving procedure.

Referring to FIG. 9, since a user equipment which is in an RRC connection mode with a first cell receives signals from the first cell through a downlink channel, the user equipment cannot receive an MBMS broadcast from a second cell. If the user equipment intends to receive the MBMS from the second cell, the user equipment may move to the second cell by performing handover to receive the MBMS. However, since the first cell is unable to identify whether the user equipment desires to receive the MBMS, the problem of being unable to perform handover arises.

Namely, handover of the user equipment connected with the first cell to the second cell is generally performed when communication with the first cell is not smoothly performed. However, the above situation indicates that handover should be performed according to whether the user equipment receives the MBMS irrespective of the communication state with the first cell. Accordingly, the first cell cannot recognize the necessity of handover.

Furthermore, the user equipment in the RRC idle state camps on one cell by performing the above-described cell selection and/or cell reselection procedure and monitors a paging signal and system information in the camped on cell. The user equipment in the RRC idle state performs the cell selection and/or cell reselection procedure according to signal quality of a cell regardless of whether the MBMS is received. Accordingly, the user equipment may select a cell which does not provide the MBMS, i.e. the first cell and then the user equipment is unable to receive the MBMS.

The present invention proposes a method in which the user equipment in an RRC connection state receives a specific MBMS through a specific frequency or the user equipment in an RRC connection state receives an MBMS broadcast by a specific cell. More specifically, the user equipment obtains information on frequencies or cells in which the specific service is provided through system information broadcast from a serving cell, and transmits response to the information on the frequencies or cells in which the MBMS that the user equipment desires to receive is broadcast to an eNB, i.e. the serving cell.

Figure 10:
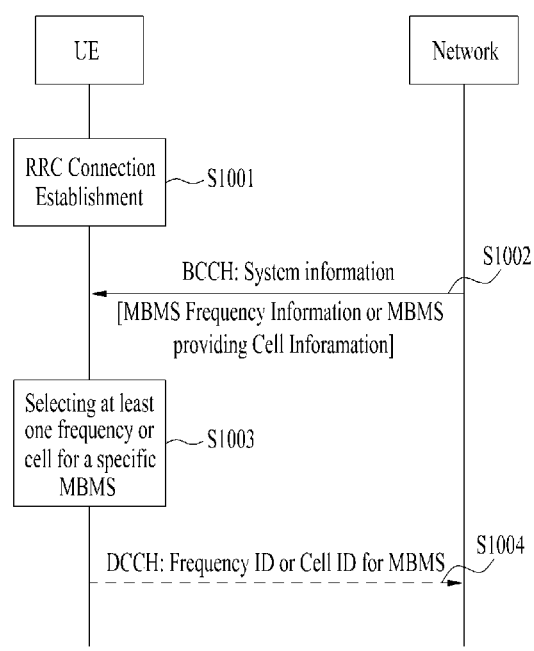
FIG. 10 is a diagram for explaining a method for providing an MBMS according to the present invention.

FIG. 10 is a diagram for explaining a method for providing an MBMS according to the present invention.

Referring to FIG. 10, it is assumed that a user equipment is in an RRC connected state with a network in step S1001. The user equipment receives information about one or more frequencies or cells in which an MBMS is provided from system information broadcast by the network, i.e. a serving cell or a specific cell in step S1002. The network may previously inform the user equipment of a mapping relationship between the frequencies and the MBMS and the mapping relationship may be included in the system information.

The user equipment selects, using the system information, a frequency or cell, in which the specific MBMS can be transmitted, from the received frequencies or cells in step S1003.

If the user equipment desires to receive the specific MBMS, the user equipment configures an RRC message including the frequency or an ID of the cell selected in step S1003, i.e. the frequency or an ID of the cell in which the specific MBMS can be transmitted, and transmits the RRC message to the network through a DCCH in step S1004. The RRC message may include MBSFN area information provided by the specific MBMS and/or an ID of the specific MBMS.

If it is determined that radio quality of a cell providing the MBMS at the frequency indicated by the RRC message is good, then the network, more specifically, the serving cell of the user equipment may perform handover of the user equipment to a corresponding cell. Alternatively, if it is determined that radio quality in a cell indicated by the RRC message is good, the serving cell may perform handover of the user equipment to a corresponding cell.

According to the present invention as described above, the user equipment in an RRC connection state acquires information about one or more frequencies or cells in which the MBMS is broadcast through system information and transmits the information about frequencies or cells in which the MBMS is broadcast to the network, so that the user equipment can receive the specific MBMS broadcast at a specific frequency/cell.

Next, the user equipment in an RRC idle state may receive the specific MBMS by the following method.

Figure 11:
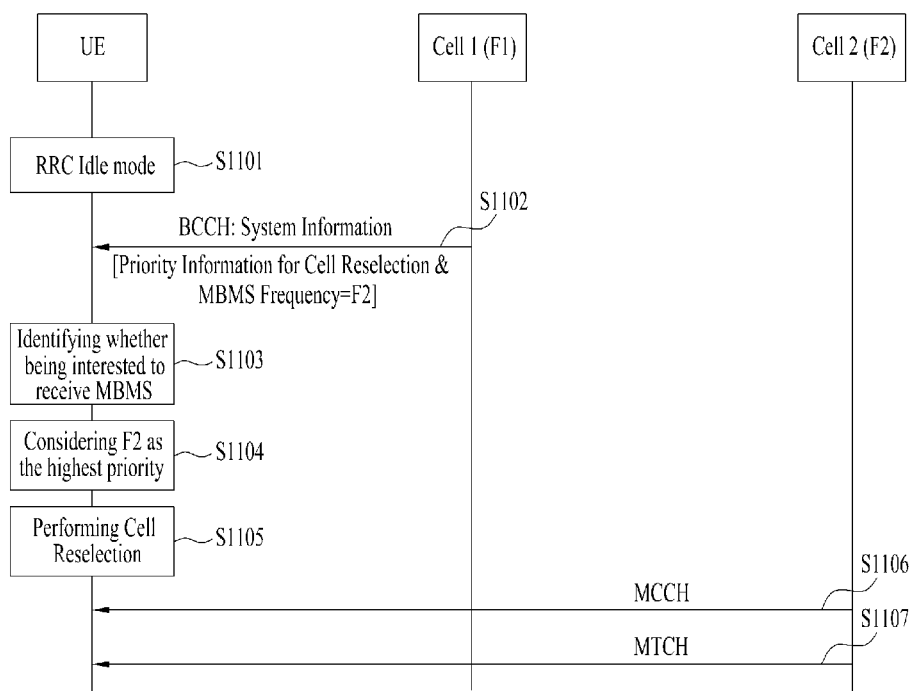
FIG. 11 is a diagram for explaining another method for providing an MBMS according to the present invention.

FIG. 11 is a diagram for explaining another method for providing an MBMS according to the present invention.

Referring to FIG. 11, the user equipment in an RRC idle state selects a cell to be camped on by performing a cell selection or cell reselection procedure. It is assumed in FIG. 11 that the user equipment selects a first cell of a frequency F1.

The user equipment acquires system information from the selected first cell in step S1102. For an MBMS, the first cell broadcasts through the system information the fact that the MBMS is provided at a frequency F2. Accordingly, if the user equipment obtains the system information from the first cell, the user equipment is able to recognize that the MBMS is provided at the frequency F2. Further, the first cell may broadcast through the system information a frequency list showing frequencies in which the MBMS is provided.

Next, the user equipment determines that it is interested in receiving the MBMS in step 1103. If the user equipment is interested in receiving the MBMS and if the user equipment is located in an area in which the MBMS is provided, the user equipment places the highest priority on the frequency F2 at which the MBMS is provided, for cell reselection, in step S1104. In other words, the user equipment assigns a higher priority to the frequency F2 at which the MBMS is provided than to other frequencies in a cell reselection priority list received from a network. Accordingly, the frequency F2 has the highest priority as opposed to priority in the cell reselection priority list which has been received from the network, and priority of the other frequencies is maintained as in the priority list received from the network.

The user equipment performs a cell reselection procedure under the state that the frequency F2 has the highest priority in step S1105. If cells operating at the frequency F2 are measured as having signal strength/quality higher than a specific threshold value during a predetermined duration, the user equipment performs cell reselection with respect to cells operating at the frequency F2. At this time, the user equipment reselects a cell having the best signal strength/quality among the cells operating at the frequency F2. In FIG. 11, it is assumed that a second cell operating at the frequency F2 is reselected.

The user equipment receives an MCCH from the second cell to acquire control information for receiving the MBMS in step S1106. The user equipment configures an MTCH using the acquired control information and receives data of the MBMS through the MTCH in step S1107.

Meanwhile, if the user equipment does not desire to receive the specific service or is not interested in receiving the specific service, the user equipment may be restored to a normal priority list.

Further, the above-described method is effective when the user equipment in an RRC idle state is located in an area in which the specific MBMS is provided. If the user equipment is not located in that area, it is desirable that the user equipment performs the cell selection and cell reselection procedures based on the normal priority list.

In the present invention, the network provides a frequency priority for cell reselection, that the user equipment is to use in an RRC idle state, through system information or an RRC connection release message, and the user equipment in the RRC idle state performs cell reselection according to the frequency priority.

As described above, the user equipment in the RRC idle state receives a priority list of frequencies from the network, identifies a frequency at which the specific MBMS is provided through the system information, and places the highest priority on the frequency at which the specific MBMS is provided from the priority list, thereby receiving the desired specific MBMS in the RRC idle state.

Figure 12:
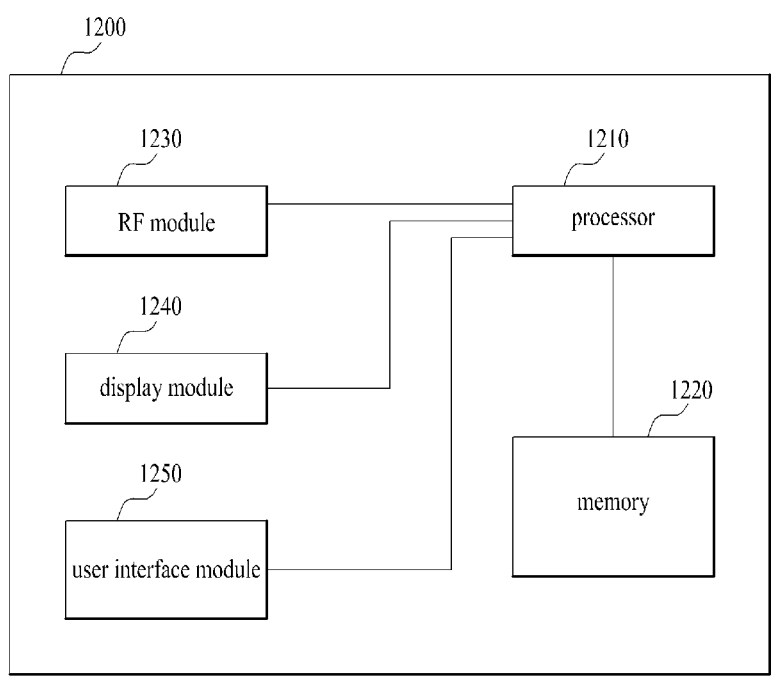
FIG. 12 is an exemplary block diagram of a communication apparatus according to one embodiment of the present invention.

FIG. 12 is an exemplary block diagram of a communication apparatus according to one embodiment of the present invention.

Referring to FIG. 12, a communication device 1200 includes a processor 1210, a memory 1220, an RF module 1230, a display module 1240 and a user interface module 1250.

The communication device 1200 is illustrated for clarity and convenience of the description and some modules can be omitted. Moreover, the communication device 1200 is able to further include at least one necessary module. And, some modules of the communication device 1200 can be further divided into sub-modules. The processor 1210 is configured to perform operations according to the embodiment of the present invention exemplarily described with reference to the accompanying drawings. In particular, the detailed operations of the processor 1210 can refer to the contents described with reference to FIGS. 1 to 11.

The memory 1220 is connected to the processor 1210 and stores an operating system, applications, program codes, data and the like. The RF module 1230 is connected to the processor 1210 and performs a function of converting a baseband signal to a radio signal or converting a radio signal to a baseband signal. For this, the RF module 1230 performs analog conversion, amplification, filtering and frequency uplink transform or inverse processes thereof. The display module 1240 is connected to the processor 1210 and displays various kinds of information. The display module 1240 can include such a well-known element as LCD (Liquid Crystal Display), LED (Light Emitting Diode), OLED (Organic Light Emitting Diode) and the like, by which the present invention is non-limited. The user interface module 1250 is connected to the processor 1210 and can include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

As mentioned in the foregoing description, although a method of providing service to a user equipment in a wireless communication system and apparatus thereof is described mainly with reference to examples applied to 3GPP LTE system, the present invention is applicable to various kinds of wireless communication systems as well as the 3GPP LTE system.

What is claimed is:

1. A communication method, performed by a user equipment (UE), the communication method comprising:
receiving, from a network, system information including a frequency list for a multimedia broadcast multicast service (MBMS) service and information of a mapping relationship between one or more frequencies included in the frequency list and a plurality of MBMS services;
identifying, using the received system information, a specific frequency among the one or more frequencies included in the frequency list for the MBMS service; and
transmitting, to the network, a radio resource control (RRC) message including the identified frequency for the MBMS service.

2. The communication method of claim 1, further comprising:
configuring the RRC message including the identified frequency for the MBMS service.

3. The communication method of claim 1, further comprising:
receiving a command for performing a handover from a serving cell to a target cell providing the MBMS service through the identified frequency.

4. The communication method of claim 3, wherein the target cell from at least one neighbor cell providing the MBMS service is selected through the identified frequency.

5. The communication method of claim 1, wherein the RRC message further includes at least one of an identity of the MBMS service or area information of the MBMS service.

6. The communication method of claim 1, wherein the UE is in an RRC connected state with the network.

7. The communication method of claim 1, wherein the system information includes a master information block (MIB), a scheduling block (SB) and a system information block (SIB).

8. The communication method of claim 7, wherein the MIB enables the UE to determine bandwidth of a corresponding cell.

9. A user equipment, comprising:
a receiver configured to receive a signal;
a transmitter configured to transmit a signal; and
a processor configured to:
control the receiver to receive, from a network, system information including a frequency list for a multimedia broadcast multicast service (MBMS) service and information of a mapping relationship between one or more frequencies included in the frequency list and a plurality of MBMS services,
identify, using the received system information, a specific frequency among the one or more frequencies included in the frequency list for the MBMS service, and
control the transmitter to transmit, to the network, a radio resource control (RRC) message including the identified frequency for the MBMS service.

10. The user equipment of claim 9, wherein the processor is further configured to:
configure the RRC message including the identified frequency for the MBMS service.

11. The user equipment of claim 9, wherein the processor is further configured to control the receiver to receive a command for performing a handover from a serving cell to a target cell providing the MBMS service through the identified frequency.

12. The user equipment of claim 11, wherein the target cell from at least one neighbor cell provides the MBMS service through the identified frequency.

13. The user equipment of claim 9, wherein the RRC message further includes at least one of an identity of the MBMS service or area information of the MBMS service.

14. The user equipment of claim 9, wherein the user equipment is in an RRC connected state with the network.

15. The user equipment of claim 9, wherein the system information includes a master information block (MIB), a scheduling block (SB) and a system information block (SIB).

16. The user equipment of claim 15, wherein the MIB enables the user equipment to determine bandwidth of a corresponding cell.

* * * * *